United States Patent [19]

Taguchi et al.

[11] Patent Number: 4,617,515
[45] Date of Patent: Oct. 14, 1986

[54] POSITION DETECTING APPARATUS

[75] Inventors: Yoshinori Taguchi; Tsuguya Yamanami, both of Ageo, Japan

[73] Assignee: Wacom Co., Ltd., Japan

[21] Appl. No.: 704,223

[22] Filed: Feb. 22, 1985

[30] Foreign Application Priority Data

Feb. 22, 1984 [JP] Japan .................................. 59-32244
Feb. 23, 1984 [JP] Japan .................................. 59-33083

[51] Int. Cl.⁴ .............................................. G01B 7/14
[52] U.S. Cl. ..................................... 324/207; 178/18; 382/3
[58] Field of Search ................. 33/1 M; 324/208, 207; 382/3; 340/365 L; 178/18, 19, 20

[56] References Cited

U.S. PATENT DOCUMENTS 4,205,199 5/1980 Machizuki ........................ 178/18 X Primary Examiner—Reinhard J. Eisenzopf
Assistant Examiner—R. Mueller
Attorney, Agent, or Firm—Pollock, VandeSande & Priddy

[57] ABSTRACT

Disclosed is a position detecting apparatus which has a position detecting section having elongated magnetic bodies and a plurality of exciting lines and a plurality of detecting lines which are arranged alternately such as to cross the magnetic bodies orthogonally thereto. A driving power source is adapted to apply A.C. voltage of a predetermined frequency to the exciting lines. A position appointing magnetism generator applies a local magnetic bias to the magnetic bodies. The position appointed by the position appointing magnetism generator is detected through the detection of the voltages induced in the detecting lines. According to this arrangement, the position appointing magnetism generator can be handled easily because it is not connected to any stationary part of the apparatus, and the position can be detected at a high precision without being affected by external induction and noises and without producing noise which would affect nearby devices.

6 Claims, 9 Drawing Figures

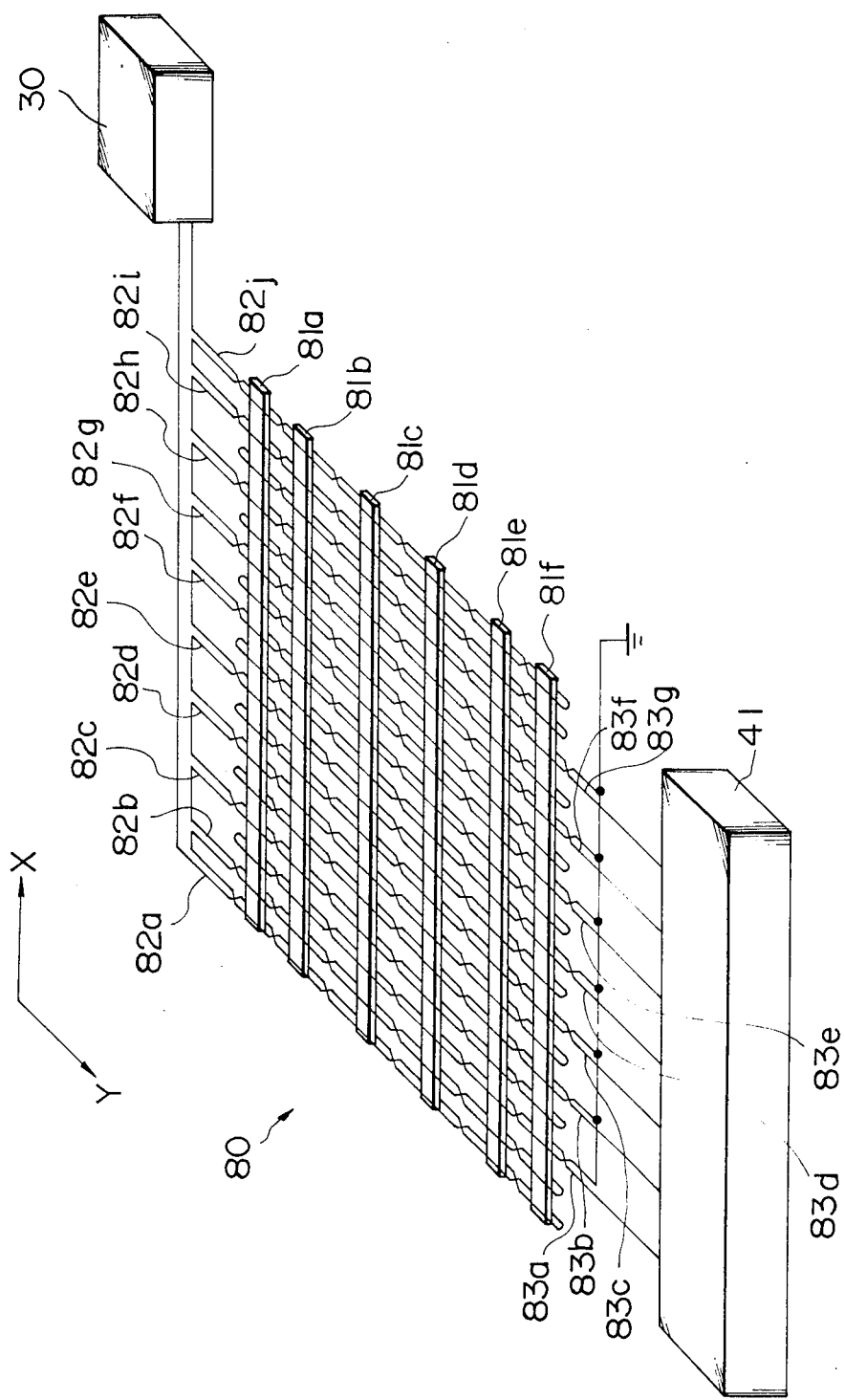

POSITION DETECTING APPARATUS

BACKGROUND OF THE INVENTION

1. Field of the Invention

The present invention relates to a position detecting apparatus adapted for detecting the position appointed by a position appointing magnetism generator, upon sensing a change in the magnetic permeability of a magnetic body which takes place when a magnetic field is applied to the magnetic body by the position appointing magnetism generator.

2. Description of the Prior Art

A position detecting apparatus is known in which a magnetostrictive transmission medium is used in combination with a position appointing pen. In this apparatus, a driving coil is provided on one end of the magnetostrictive transmission medium or on the end of the position appointing pen, while a detecting coil is provided on the end of the position appointing pen or one end of the magnetostrictive transmission medium. In operation, a pulse current is supplied to the driving coil to generate a magnetostrictive vibration wave in the magnetostrictive transmission medium, and the time duration between the moment at which the magnetostrictive vibration wave is generated and the moment at which the voltage induced by the magnetostrictive vibration wave is detected by the detecting coil is measured and processed by a suitable processor, thus detecting the position appointed by the position appointing pen. This known position detecting apparatus permits a considerably high precision of position detection, but suffers from problems due to the necessity for a cord through which the pen and the processor are connected to each other for the exchange of timing signals. Specifically, the handling of the pen is inconveniently hindered by the presence of the cord. In addition, the cord tends to pick-up noises due to induction of voltage by the influence of other devices, often resulting in erroneous operation. The presence of the cord also affects other devices through generation of noises. It is to be pointed out also that the pen has to be maintained substantially normal to and in the close proximity of the magnetostrictive transmission medium.

Another known position detecting apparatus has a plurality of driving lines and a plurality of detecting lines which are arranged orthogonally to each other. In operation, electric current is supplied successively to the driving lines while the detecting lines are scanned for the detection of voltage induced in one of the detecting lines when approached by a position appointing pen having a magnetic body such as ferrite. This apparatus does not require any cord for connecting the pen to the stationary part of the apparatus so that most of the problems encountered by the first-mentioned apparatus are overcome. In this apparatus, however, the resolution of the coordinate positions is determined by the pitches of the lines. It is quite difficult to attain high resolution through arranging the lines at small pitches because such small pitches impose other problems such as poor S/N ratio and low stability of operation. In addition, it is quite difficult with this apparatus to detect positions which are on the points of intersection between the driving lines and detecting lines. Furthermore, since the position appointing pen must be used in the close proximity of the lines, it is impossible to appoint the position through the intermediary of a thick structure placed on the tablet formed by the driving and detecting lines.

SUMMARY OF THE INVENTION

It is a first object of the invention to provide a position detecting apparatus comprising: a position detecting section having elongated magnetic bodies and a plurality of exciting lines and a plurality of detecting lines which are arranged alternately such as to cross the magnetic bodies orthogonally thereto; a driving power source adapted to apply A.C. voltage of a predetermined frequency to the exciting lines; a position appointing magnetism generator for applying a local magnetic bias to the magnetic bodies; and a detecting means for detecting the position appointed by the position appointing magnetism generator by detecting the voltages induced in the detecting lines.

According to this arrangement, a change in the magnetic flux between the exciting line and the detecting line is made only within the magnetic body so that a close electromagnetic coupling between the exciting line and the detecting line is attained thus ensuring a high level of detection voltage with a high S/N ratio, while minimizing the induction by external noise, as well as minimized induction noise to other devices in the surrounding environment. In addition, since the position can be appointed by applying only a small magnetic bias to the magnetic body, it is not necessary to bring the position appointing magnetism generator to the close proximity of the magnetic body. In consequence, the effective reading height, i.e., the range of height of the magnetism generator above the magnetic body within which the position reading can be made satisfactorily, is increased advantageously. In fact, it is possible to place a metal other than a ferromagnetic metal between the position appointing magnetism generator and the magnetic body. In addition, since the exchange of signal such as the timing signal between the position appointing magnetism generator and the stationary part of the apparatus is unnecessary, the need for a connecting means such as cord can be eliminated, thus improving the handling of the position appointing magnetism generator.

It is a second object of the invention to provide a position detecting apparatus comprising: an X-direction position detecting section having a plurality of elongated magnetic bodies arranged substantially in parallel, and a plurality of exciting lines and detecting lines which are arranged alternately such as to orthogonally cross the elongated magnetic bodies; a Y-direction position detecting section having a construction similar to that of the X-direction position detecting section and superposed thereto; a driving current source adapted to apply A.C. currents of a predetermined frequency to the exciting lines in the X- and Y-direction position detecting sections; a position appointing magnetism generator adapted for applying local magnetic bias to the magnetic bodies of the X- and Y-direction position detecting sections; X- and Y-direction signal selecting means connected to the detecting lines of the X- and Y-direction position detecting sections; and a processing means for computing the coordinate position appointed by the position appointing magnetism generator from the induced voltage derived from the X- and Y-direction signal selecting means.

This arrangement offers, in addition to the advantages derived from the position detecting apparatus achieved by the first object, a two-dimensional position detection.

It is a third object of the invention to provide a position detecting apparatus, wherein the exciting lines of the X- and Y-direction position detecting sections are arranged such that the polarities of the magnetic fluxes formed by the exciting lines or the polarities of the electric current formed in the exciting lines are inverted for every other magnetic body or for every two or more magnetic bodies.

According to this arrangement, when a driving current is supplied to the exciting lines, the magnetic fluxes on adjacent magnetic bodies negate each other thus weakening the induction and noise which would affect the devices in the surrounding environment. In addition, when a magnetic flux of a certain polarity is applied to the detecting lines, the electric currents caused by such a magnetic flux negate each other, thus reducing the influence of the external induction and noise. It is, therefore, possible to detect the induced voltage with a high S/N ratio.

It is a fourth object of the invention to provide a position detecting apparatus, wherein the detecting lines of the X- and Y-direction position detecting sections are arranged such that the polarities of the magnetic fluxes formed by the detecting lines or the polarities of the electric currents formed in the detecting lines are inverted for every other magnetic body or every two or more magnetic bodies.

According to this arrangement, when driving currents are supplied to the exciting lines, the magnetic fluxes on adjacent magnetic bodies negate each other to weaken the induction and noise which would affect the nearby devices. In addition, when a magnetic flux of a certain polarity is applied to the detecting lines, the electric currents caused by such a magnetic flux negate each other thus reducing the influence of the external induction and noise. It is, therefore, possible to detect the induced voltage with a high S/N ratio.

It is a fifth object of the invention to provide a position detecting apparatus, wherein either the X- and Y-direction exciting lines or the X- and Y-direction detecting lines or, alternatively, both of the X- and Y-direction exciting lines and X- and Y-direction detecting lines corresponding to X- and Y-direction magnetic bodies disposed at both ends of respective parallel rows of the magnetic bodies are arranged closely to the magnetic bodies as compared with other exciting and-/or detecting lines.

With this arrangement, since the exciting lines and detecting lines associated with the magnetic bodies on both ends of the rows of magnetic bodies are arranged close to these magnetic bodies as compared with other exciting and detecting lines, a closer electro-magnetic coupling is attained on the magnetic bodies disposed at both ends of respective rows of the magnetic bodies, thus compensating for any reduction in the level of detection voltage in the end regions of the position detecting sections.

It is a sixth object of the invention to provide a position detecting apparatus, wherein the exciting lines are arranged more densely at both longitudinal ends of the magnetic bodies of the X- and Y-direction position detecting sections than at other portions of the magnetic bodies.

With this arrangement, since a greater number of exciting lines is arranged on each longitudinal end of each magnetic body, any reduction in the detection voltage on the end portions of each magnetic body is avoided advantageously.

These and other objects, features and advantages of the invention will become clear from the following description of the preferred embodiments when the same is read in conjunction with the accompanying drawings.

BRIEF DESCRIPTION OF THE DRAWINGS

FIG. 9 is a perspective view of an X-direction position detecting section in another embodiment of the invention.

DESCRIPTION OF THE PREFERRED EMBODIMENTS

Figure 1:
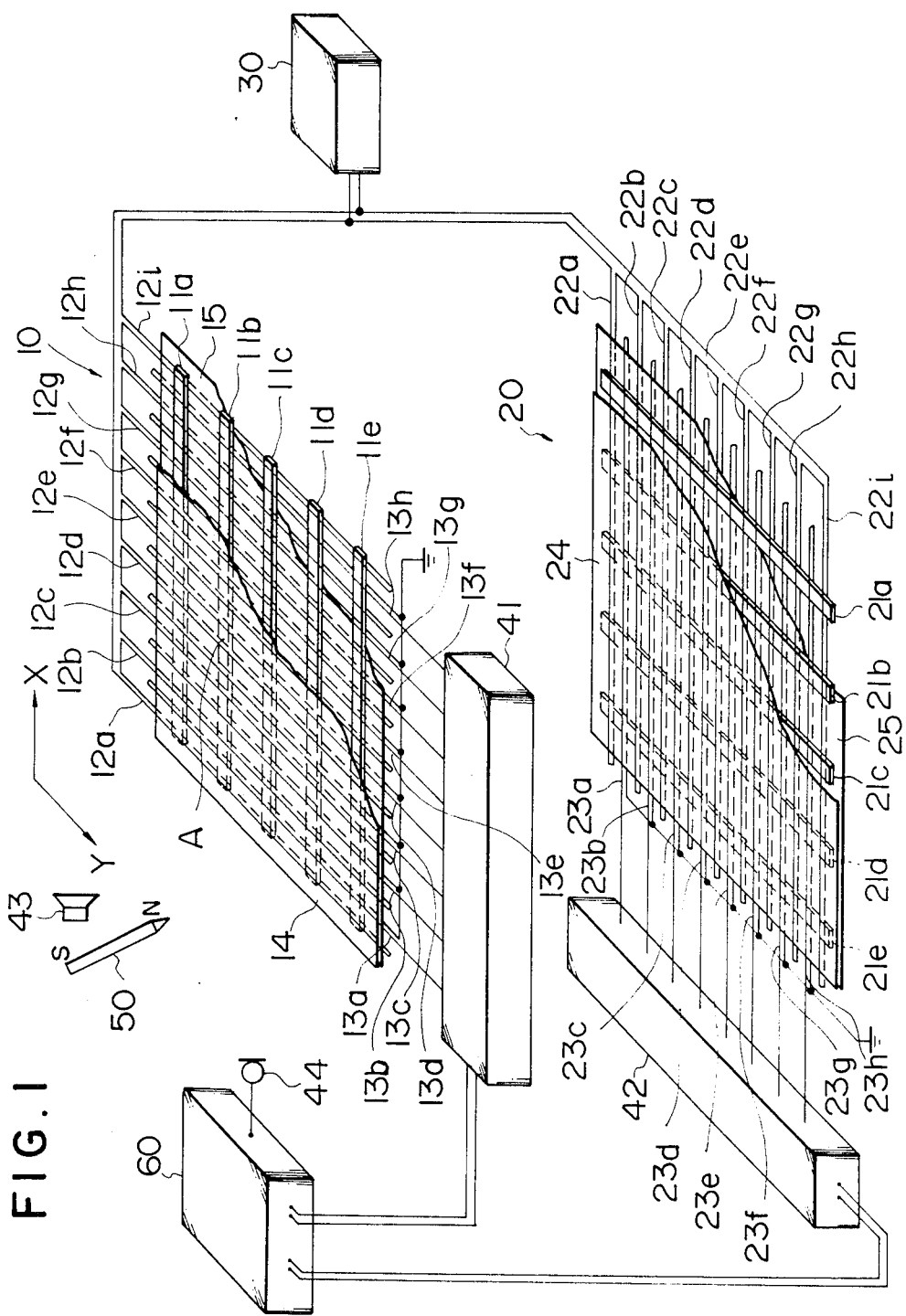
FIG. 1 is a partly exploded perspective view of an embodiment of the invention.

FIG. 1 is a partly exploded perspective view of an embodiment of the position detecting apparatus of the invention. This position detecting apparatus is constituted mainly by an X-direction position detecting section 10, a Y-direction position detecting section 20, a driving current source 30, signal selecting means 41,42 such as multiplexers, a position appointing magnetism generator 50 such as a bar magnet, and a processing unit 60.

The X-direction position detecting section 10 is composed of elongated magnetic bodies 11a–11e, exciting lines 12a to 12i, detecting lines 13a to 13h and insulating sheets 14 and 15. The magnetic bodies 11a to 11e are sandwiched between both insulating sheets 14 and 15 such as to extend in an X-direction in parallel with one another.

The magnetic bodies 11a to 11e are made of a material which can hardly be magnetized even when approached by a magnet, i.e., a material having a small coercive force and a high magnetic permeability ($\mu$). Examples of such a material are amorphous alloys, permalloys and so forth. A typical example of the amorphous alloys usable as the material of the magnetic bodies 11a to 11e is an alloy expressed by $Fe_{79}B_{16}Si_5$ (atom %) which has a coercive force of 0.2 Oe and a magnetic permeability of 14,0000. The magnetic bodies 11a to 11e have an elongated thin web-like form with a rectangular cross-section or an elongated linear form with a circular cross-section.

When the thin web-like form is adopted, the magnetic body preferably has a width of about several millimeters and a thickness which ranges between several and several tens of micron meters ($\mu$m) because such a width and thickness facilitate its production and ensures an excellent performance. In general, amorphous alloy can be produced in the form of a thin ribbon having a thickness of 20 to 50 μm, so that the magnetic bodies can be produced by cutting such ribbons into segments. The amorphous alloy can be produced also in the form of a line having a circular cross-section, which line may be cut into segments to be used as the magnetic bodies.

Each of the exciting lines 12a to 12i has an upper half part laid on the upper side of the insulating sheet 14 and a lower half part laid in contact with the lower side of the insulating sheet 15. The upper and lower half parts of respective exciting lines 12a to 12i are connected at their adjacent ends to each other. In addition, the other ends of the lower half parts of the exciting lines 12a, 12b, 12c, 12d, 12e, 12f, 12g and 12h are connected to the other ends of the upper half parts of the exciting lines 12b, 12c, 12d, 12e, 12f, 12g, 12h and 12i, respectively. Thus, the exciting lines 12a to 12i are connected in series, and the other end of the upper half part of the exciting line 12a and the other end of the lower half part of the exciting line 12i are connected to the driving current source 30. The exciting lines 12a to 12i are arranged at a predetermined pitch such as to orthogonally cross the magnetic bodies 11a to 11e.

Each of the detecting lines 13a to 13h has an upper half part arranged on the upper side of the insulating sheet 14 and a lower half part arranged to be in contact with the lower side of the insulating sheet 15. The upper and lower half parts of each detecting line are connected at their one ends. The other ends of the upper half parts of the detecting lines 13a to 13h are connected to a multiplexer 41, while the other ends of the lower half parts of the same are grounded commonly. The detecting lines 13a to 13h are arranged between adjacent exciting lines 12a to 12i such as to orthogonally cross the magnetic bodies 11a to 11e.

The Y-direction position detecting section 20 is composed of elongated magnetic bodies 21a to 21e, exciting lines 22a to 22i, detecting lines 23a to 23h and insulating sheets 24 and 25. The construction of the Y-direction position detecting section 20 is substantially identical to that of the X-direction position detecting section 10. The Y-direction position detecting section 20 is laid under the X-direction position detecting section 10 through the intermediary of an insulating sheet (not shown) as closely as possible to the X-direction position detecting section 10 and such that the magnetic bodies, exciting lines and the detecting lines of both position detecting sections orthogonally cross each other, although in FIG. 1 both position detecting sections 10 and 20 are shown to be apart from each other in order to facilitate an understanding of the construction. The exciting lines 22a to 22i are connected to the driving current source 30, while the detecting lines 23a to 23h are connected to a multiplexer 42.

The driving current source 30 continuously supplies an A.C. current of a predetermined frequency to the exciting lines 12a to 12i and 22a to 22i. The A.C. current in this case may be an alternating current having any waveform such as sine wave, rectangular wave, triangular wave and so forth. The multiplexers 41 and 42 are adapted to selectively deliver the output signals from the detecting lines 13a to 13h and 23a to 23h to the processing unit 60, in accordance with a control signal delivered by the processing unit 60.

A reference numeral 43 designates a transmitter which delivers a supersonic signal to the processing unit 60 to inform the latter of the commencement of the measurement, while a numeral 44 designates a receiver for receiving this supersonic signal. In this embodiment, supersonic ceramic microphones operable both as transmitter and receiver are used as the transmitter 43 and the receiver 44, respectively. The manner of use of the transmitter 43 and the receiver 44 will be described later.

Figure 2:
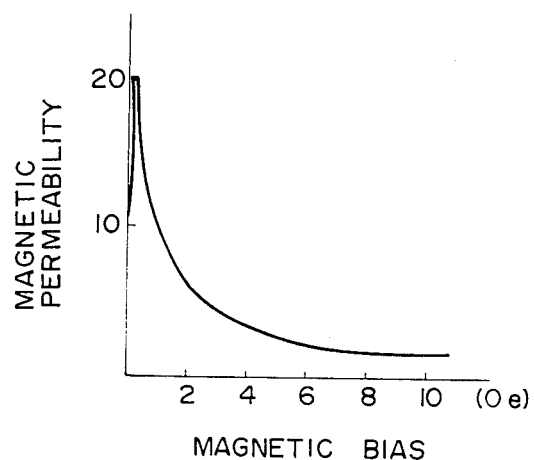
FIG. 2 is a diagram showing the relationship between the level of magnetic bias and the magnetic permeability.

As a result of the supply of the A.C. currents to the exciting lines 12a to 12i and 22a to 22i, voltages are induced in the detecting lines 13a to 13h and 23a to 23h by electromagnetic induction. Since this electromagnetic induction is made through the magnetic bodies 11a to 11e and 21a to 21e, the levels of the induced voltages are increased as the magnetic permeability of the magnetic bodies 11a to 11e and 21a to 21e is increased. On the other hand, the magnetic permeabilities of the magnetic bodies 11a to 11e and 21a to 21e are changed in a manner shown in FIG. 2 by an external magnetic bias. It will be seen that the magnetic permeability is drastically decreased as the magnetic bias is increased. Therefore, if a magnetic bias is applied to the magnetic bodies 11a to 11e and 21a to 21e, the levels of the voltages induced in the detecting lines 13a to 13h and 23a to 23h by the A.C. currents in the exciting lines 12a to 12i and 22a to 22i is decreased drastically.

Referring again to FIG. 1, it is assumed here that the position appointing magnetism generator 50, with its N-pole directed downwardly, is located above a position A which is spaced in the X-direction by a distance $x_s$ from the detecting line 13a and in the Y-direction by a distance $y_s$ from the detecting line 23a, and a magnetic bias of a level just capable of reducing the magnetic permeability is applied to the magnetic bodies 11b and 21d.

Figure 3:
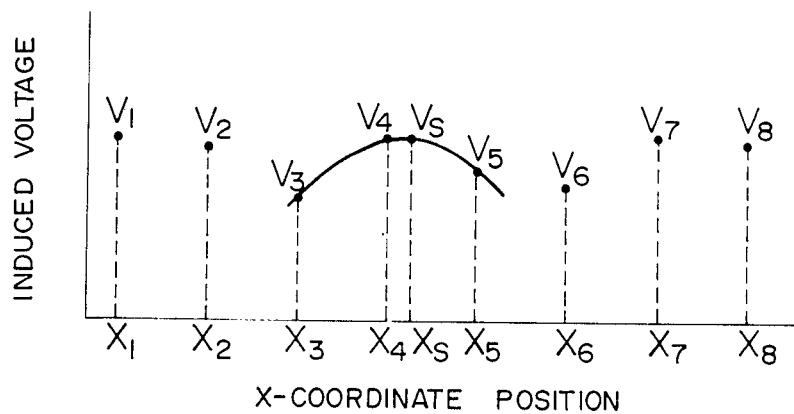
FIG. 3 is a graph showing the voltage induced in each X-direction detecting line.

In this state, induced voltages $V_1$ to $V_8$ are generated in the X-direction detecting lines 13a and 13h as shown in FIG. 3. More specifically, in FIG. 3, the axis of abscissa represents the X-direction coordinate position in which $x_1$ to $x_8$ represent the positions of the detecting lines 13a to 13h, while the axis of coordinate represents the voltage. It will be seen that the voltages $V_1$ to $V_8$ draw a curve which has a peak at a point corresponding to the position A. At each side of the peak position, the voltage is once decreased and then increased again as the distance from the peak position is increased. This is attributable to the fact that the magnetic flux produced by the bar magnet 50 coming into the magnetic body 11b crosses the magnetic body 11b substantially orthogonally when the magnetic body 11b is at the position just under the bar magnet 50 so that the magnetic permeability is influenced only slightly, whereas, when the bar magnet 50 is disposed at either one side of the magnetic body 11b, the magnetic flux passing the magnetic body 11b in the longitudinal direction thereof is increased to cause an appreciable reduction in the magnetic permeability. Since the voltages $V_1$ to $V_8$ are derived through the multiplexer 41, it is possible to know the coordinate value $x_s$ of the bar magnet 50, by computing the position of the peak which appears after a temporary reduction in the induced voltage.

One of the computing methods for computing the coordinate value $x_s$ will be explained hereinunder. The waveform of the portion of the curve drawn by the induced voltages around the peak point is approximated by a suitable function. For instance, representing the pitch of the detecting lines 13a to 13h by $\Delta x$, the portion of the curve between the x-coordinate positions $x_3$ and $x_5$ is approximated by a function of secondary degree shown by the solid line curve in FIG. 3. Using this function, the coordinate value of the peak position can be determined as follows:

The following relationships are obtained from the coordinate positions of respective detecting lines and the voltages induced in these detecting lines:

$$V_3 = a(x_3 - x_s)^2 + b \quad (1)$$

$$V_4 = a(x_4 - x_s)^2 + b \quad (2)$$

$$V_5 = a(x_5 - x_s)^2 + b \quad (3)$$

where, a and b are constants ($a < 0$).
The following relationships also exist:

$$x_4 - x_3 = \Delta x \quad (4)$$

$$x_5 - x_3 = 2\Delta x \quad (5)$$

The following equation (6) is derived by trimming the formulae (2) and (3) after substituting formulae (4) and (5) to the formulae (2) and (3)

$$x_s = x_3 + \frac{\Delta x}{2} \cdot \frac{3V_3 - 4V_4 + V_5}{V_3 - 2V_4 + V_5} \quad (6)$$

Therefore, the processing unit 60 can compute the X-coordinate position $x_s$ of the position appointing bar magnet 50, upon receipt of the signals representing the voltages $V_3$, $V_4$ and $V_5$ induced in the detecting lines 13c, 13d and 13e. The X-coordinate value produced by the processing unit 60 is not changed even when the bar magnet 50 is moved along the Y-axis.

An induction voltage curve similar to that shown in FIG. 3 is obtained also over the Y-direction detecting lines 23a to 23h, and the Y-coordinate value $y_s$ of the bar magnet 50 is obtained by the same computation as that explained hereinabove.

Figure 4:
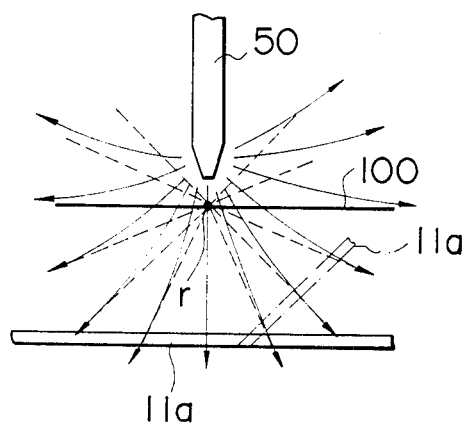
FIG. 4 shows the manner in which a magnetic flux is applied to the magnetic body by a position appointing magnetism generator.

Referring to FIG. 4, the magnetic flux emerging from the end of the position appointing bar magnet 50 can be approximated by a magnetic flux which is assumed to be developed from a point r on the extension of the axis of the bar magnet 50. Therefore, if the input surface 100 is formed within the distance to the point r, the directions of the magnetic field with respect to the magnetic bodies 11a to 11e and 21a to 21e are not changed, even if the bar magnet 50 is inclined with respect to the magnetic bodies 11a to 11e and 21a to 21e. In FIG. 4, the bar magnet 50 is inclined with respect to the magnetic body 11a which is shown by two-dot-and-dash line. Thus, the position can be appointed safely substantially irrespective of the inclination of the bar magnet 50 with respect to the magnetic bodies. In fact, experiment showed that the position can be appointed within an error of less than ±0.5 mm when the bar magnet was inclined within the range of ±30° at the input plane height of 12 mm.

Figure 5:
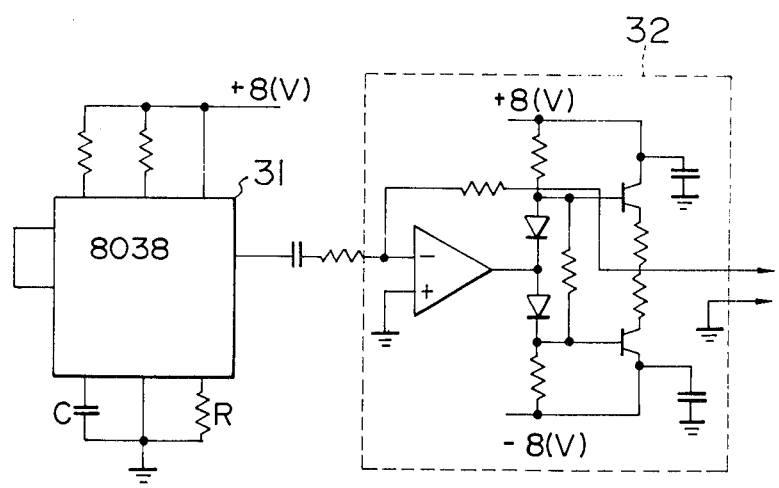
FIG. 5 is a circuit diagram of an example of the driving current source.

FIG. 5 shows a practical example of the driving current source. The driving current source has a function generator 31 which may be an IC 8038 made by Inter Sil, adapted to produce a sine wave signal of a suitable frequency which is determined by the capacitance of the capacitor C and the resistance of the resistor R. A numeral 32 denotes a power driver which is constituted by an operation amplifier and a differential amplifier. The power driver 32 is adapted to effect a current-amplification of the sine wave signal and to deliver the amplified signal to the exciting lines 12a to 12i and 22a to 22i.

Figure 6:
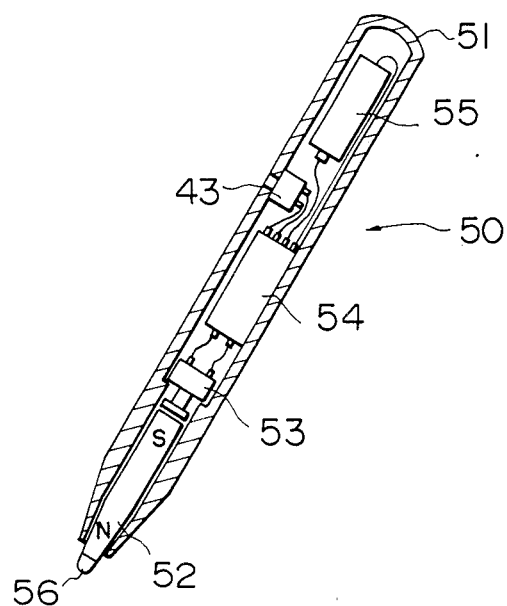
FIG. 6 is a sectional view of a practical example of a position appointing magnetism generator.
Figure 7:
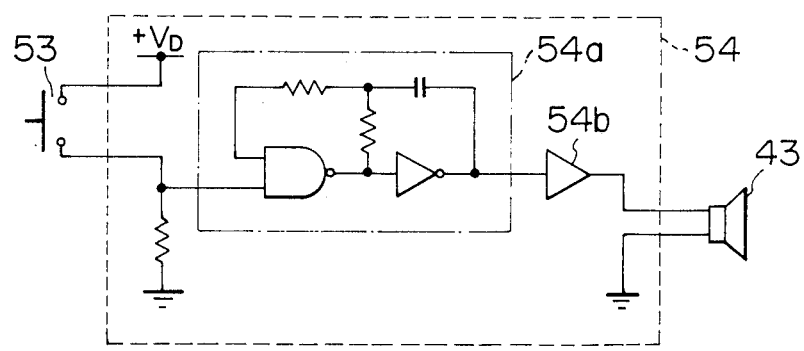
FIG. 7 is an electric circuit diagram of the position apointing magnetism generator.

FIG. 6 is a sectional view of a practical example of the position appointing magnetism generator 50, while FIG. 7 is an electric circuit diagram of the same. The position appointing magnetism generator 50 has a pen-shaped vessel 51 made of a plastic or a similar material. A bar magnet 52 is slidably mounted on one end of the vessel 51, such that one end of the bar magnet 52 is projectable from the end of the vessel 51. An operation switch 53 is mounted such as to oppose the other end of the bar magnet 52. A supersonic signal transmitter 54, battery 55 and a receiver 43 are accommodated by the vessel 51 at suitable portions thereof. A rubber cover 56 is secured to the end of the bar magnet 52. In operation, the user holds the vessel 51 and presses the end of the bar magnet 52 covered by the rubber cover 56 onto the input surface. As a result, the bar magnet 52 is moved into the vessel 51 thus turning the switch 53 on, thereby activating the oscillation circuit 54a and the amplifier 54b in the transmitter 54, so that a signal representing the commencement of the measurement, e.g., a continuous pulse signal of a predetermined frequency, is changed into a supersonic signal which is then transmitted from the transmitter 43.

Figure 8:
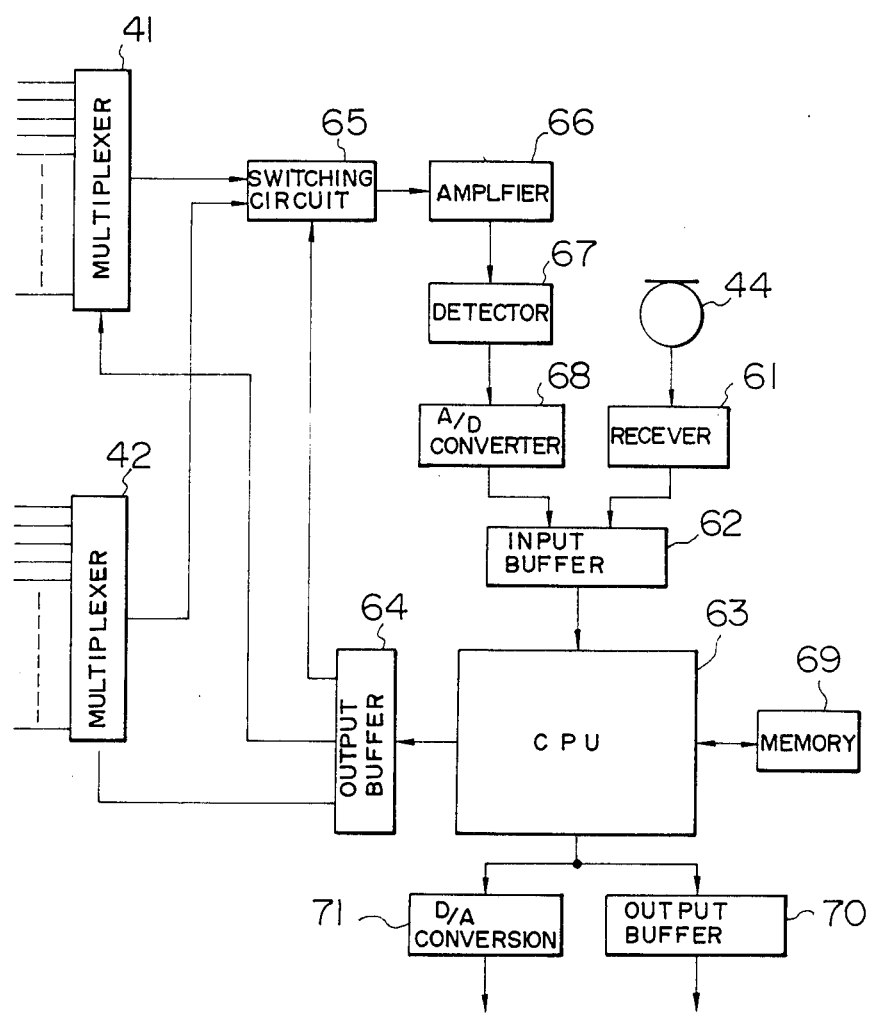
FIG. 8 is a block diagram of a practical example of a processing unit.

FIG. 8 is a block diagram showing a practical example of the processing unit 60. This processing unit 60 has a catcher 44 which catches the supersonic signal transmitted by the transmitter 43 and indicative of the commencement of the measurement. The supersonic signal is then amplified and shaped by a receiver 61 to become the original signal which is in this case the continuous pulse signal of the predetermined period, which is then delivered to an input buffer 62. A processor 63, which acknowledges the commencement of measurement upon receipt of the continuous pulse signal from the input buffer 62, delivers a control signal to a switching circuit 65 and the multiplexer 41 through the output buffer circuit 64, while successively delivering the voltages induced in the X-direction detecting lines 13a to 13h to an amplifier 66. The induced voltages thus delivered are amplified by the amplifier 66 and are rectified by a detector 67 into D.C. voltages which are then converted into digital signals by means of an A/D converter 68. These digital signals are then delivered to the processor 63 through the input buffer 62. The processor 63 has a memory 69 which temporarily stores the digital signals representing the induced voltages. The processor 63 then detects the voltage values around the peak. This detection can be made, for example, by comparing the values of successive induced voltages. Assuming here that a voltage $V_k$ is greater than the preceding voltage $V_{k-1}$ and also greater than the succeeding voltage $V_{k+1}$, the voltage $V_k$ is judged to be a peak voltage. The processor 63 then computes the X-coordinate position in accordance with the formula (6) mentioned before, using the voltages $V_{k-1}$, $V_k$ and $V_{k+1}$ as the voltages $V_3$, $V_4$ and $V_5$, respectively.

Then, the processor 63 delivers a control signal to the switching circuit 65 and the multiplexer 42 through the output buffer 64, and successively receives the voltages induced in the Y-direction detecting lines 23a to 23h, and computes the Y-coordinate value in the same way as the computation of the X-direction coordinate position.

The X- and Y-coordinate positions thus computed are delivered through an output buffer 70 to a digital display (not shown) for the displaying purposes or to a computer (not shown) for a suitable processing. In some cases, the digital values representing the X- and Y-coordinate values are processed after a conversion into analog signals by a D/A converter 71.

FIG. 9 is a perspective view of another embodiment of the invention, from which the Y-direction position detecting section is omitted for the clarification of the drawing. This embodiment has an X-direction position detecting section 80 which is composed of elongated magnetic bodies 81a to 81f, exciting lines 82a to 82i and detecting lines 83a to 83g. The magnetic bodies 81a to 81f extend in the X-direction in parallel with one another. The material of these magnetic bodies 81a to 81f may be the same as that in the preceding embodiment. The exciting lines 82a to 82i are arranged in parallel with one another such as to wind around the magnetic bodies 81a to 81f and to orthogonally cross the same. The distance between the exciting lines 82a and 82b and the distance between the exciting lines 82i and 82j are selected to be smaller than the ordinary pitch of the exciting lines 82c to 82h. Each of the exciting lines 82a to 82i is twisted at portions between adjacent magnetic bodies such that the portions thereof corresponding to one magnetic body are inverted from those associated with adjacent two magnetic bodies. The portions of each exciting line around the magnetic bodies 81a and 81f disposed at both ends are arranged closely to these magnetic bodies as compared with other portions thereof. The exciting lines 82a to 82i are connected in series such that these exciting lines produce the same magnetic fluxes when they are supplied with an electric current. Both ends of this series connection are connected to a driving current source 30.

The detecting lines 83a to 83g are disposed in parallel with one another between adjacent exciting lines 82b to 82i such as to wind around the magnetic bodies 81a to 81f and to orthogonally cross the same. Each of the detecting lines 83a to 83g is twisted at the portions thereof which lie between adjacent magnetic bodies 81a to 81f such that the portion around one magnetic body is inverted with respect to those associated with adjacent magnetic bodies. The portions of each detecting line associated with the magnetic bodies 81a and 81f are arranged more closely to these magnetic bodies than are other portions thereof. The detecting lines 83a to 83g are connected at their one ends to the multiplexer 41, while the other ends are grounded commonly.

According to this arrangement, when the driving current is supplied to the exciting lines 82a to 82i, the magnetic fluxes appearing on the portions of the exciting lines on adjacent magnetic bodies exhibit opposite polarities such as to negate each other, thus weakening the induction and noise which would influence nearby devices. In addition, when a magnetic field of a certain polarity is applied to the detecting lines 83a to 83g, electric currents produced in the portions of the detecting lines on adjacent magnetic bodies negate each other, thus weakening external induction and noise. For these reasons, according to this arrangement, it is possible to detect the induced voltage with a high S/N ratio. In addition, any tendency for detection voltage to lower at both longitudinal end portions of the magnetic bodies is avoided because the exciting lines are arranged more densely on these portions than on other portions of the magnetic bodies. It is to be noted also that any tendency for the detection voltage to lower in the regions around the magnetic bodies disposed at both ends of the rows of magnetic bodies, i.e., around the magnetic bodies 81a and 81f, is avoided because the portions of the exciting lines and the detecting lines on such magnetic bodies are disposed closely thereto as compared with other portions of these lines associated with other magnetic bodies.

Although the described embodiment is constructed such that different polarities of magnetic fluxes and different polarities of the electric currents appear on every other magnetic body, this is not exclusive and the arrangement may be such that the different polarities appear on every two others or more of the magnetic bodies.

Needless to say, the numbers of the magnetic bodies, exciting lines and the detecting lines in the described embodiments are only illustrative, and the apparatus of the invention can have any desired numbers of these constituents. Experiments show that a satisfactorily high precision of position detection can be attained when the detecting lines are arranged at a pitch of 2 to 6 mm. It is to be understood also that the bar magnet used in the described embodiments is not exclusive, and various other magnets such as a tabular magnet, ring magnet, polygonal magnet and even a solenoid can be used as the position appointing magnetism generator.

What is claimed is:

1. A position detecting apparatus comprising: a position detecting section having elongated magnetic bodies and a plurality of exciting lines and a plurality of detecting lines which are arranged alternately such as to cross said magnetic bodies orthogonally thereto; a driving power source adapted to apply A.C. voltage of a predetermined frequency to said exciting lines; a position appointing magnetism generator for applying a local magnetic bias to said magnetic bodies; and a detecting means for detecting the position appointed by said position appointing magnetism generator by detecting the voltages induced in said detecting lines.

2. A position detecting apparatus comprising: an X-direction position detecting section having a plurality of elongated magnetic bodies arranged substantially in parallel, and a plurality of exciting lines and detecting lines which are arranged alternately such as to orthogonally cross said elongated magnetic bodies; a Y-direction position detecting section having a construction similar to that of said X-direction position detecting section and superposed thereto; a driving current source adapted to apply A.C. currents of a predetermined frequency to the exciting lines in said X- and Y-direction position detecting sections; a position appointing magnetism generator adapted for applying local magnetic bias to said magnetic bodies of said X- and Y-direction position detecting sections; X- and Y-direction signal selecting means connected to said detecting lines of said X- and Y-direction position detecting sections; and a processing means for computing the coordinate position appointed by said position appointing magnetism generator from the induced voltage derived from said X- and Y-direction signal selecting means.

3. A position detecting apparatus according to claim 2, wherein said exciting lines of said X- and Y-direction position detecting sections are arranged such that the polarities of the magnetic fluxes formed by said exciting lines or the polarities of the electric currents formed in said exciting lines are inverted for every other magnetic body or every two or more magnetic bodies.

4. A position detecting apparatus according to claim 2 or 3, wherein said detecting lines of said X- and Y- direction position detecting sections are arranged such that the polarities of the magnetic fluxes formed by said detecting lines or the polarities of the electric currents formed in said detecting lines are inverted for every other magnetic body or every two or more magnetic bodies.

5. A position detecting apparatus according to claims 2 or 3, wherein either the X- and Y-direction exciting lines or the X- and Y-direction detecting lines or, alternatively, both of the X- and Y-directions exciting lines and X- and Y-direction detecting lines corresponding to X- and Y-direction magnetic bodies disposed at both ends of respective parallel rows and arranged closely to said magnetic bodies as compared with other exciting and/or detecting lines.

6. A position detecting apparatus according to claims 2 or 3, wherein said exciting lines are arranged more densely at both longitudinal ends of said magnetic bodies of said X- and Y-direction position detecting sections than at other portions of said magnetic bodies.

* * * * *

UNITED STATES PATENT AND TRADEMARK OFFICE
CERTIFICATE OF CORRECTION

PATENT NO. : 4,617,515

DATED : October 14, 1986

INVENTOR(S) : Yoshinori Taguchi, et al.

It is certified that error appears in the above-identified patent and that said Letters Patent is hereby corrected as shown below:

Column 4, line 25, "apointing" should be --appointing--.

Column 4, line 59, "14,0000" should be --14,000--.

Column 11, line 10, "directions" should be --direction--.

Signed and Sealed this

Seventeenth Day of March, 1987

Attest:

DONALD J. QUIGG

Attesting Officer

Commissioner of Patents and Trademarks